United States Patent
Song et al.

(10) Patent No.: US 9,081,821 B2
(45) Date of Patent: Jul. 14, 2015

(54) SPELL CHECK USING COLUMN CURSOR

(71) Applicants: Guanglei Song, San Jose, CA (US);
Anand Lakshminath, Fremont, CA (US); Nicholas Whyte, San Jose, CA (US); Prasad Sriram, Manchester, CT (US); Davide Libenzi, San Jose, CA (US)

(72) Inventors: Guanglei Song, San Jose, CA (US);
Anand Lakshminath, Fremont, CA (US); Nicholas Whyte, San Jose, CA (US); Prasad Sriram, Manchester, CT (US); Davide Libenzi, San Jose, CA (US)

(73) Assignee: eBay Inc., San Jose, CA (US)

( * ) Notice: Subject to any disclaimer, the term of this patent is extended or adjusted under 35 U.S.C. 154(b) by 72 days.

(21) Appl. No.: 13/711,287

(22) Filed: Dec. 11, 2012

(65) Prior Publication Data

US 2014/0032532 A1    Jan. 30, 2014

Related U.S. Application Data

(60) Provisional application No. 61/675,793, filed on Jul. 25, 2012.

(51) Int. Cl.
*G06F 17/30*    (2006.01)

(52) U.S. Cl.
CPC ...... *G06F 17/3053* (2013.01); *G06F 17/30011* (2013.01); *G06F 17/30321* (2013.01); *G06F 17/30424* (2013.01); *G06F 17/30622* (2013.01); *G06F 17/30702* (2013.01)

(58) Field of Classification Search
USPC ......... 707/101, 767, 803, 805, 709, 728, 765, 707/706, 722
See application file for complete search history.

(56) References Cited

U.S. PATENT DOCUMENTS

| | | | | |
|---|---|---|---|---|
| RE32,773 E | * | 10/1988 | Goldwasser et al. | 715/205 |
| 5,576,734 A | * | 11/1996 | Daniele et al. | 345/168 |
| 7,925,676 B2 | * | 4/2011 | Hogue et al. | 707/803 |
| 8,051,385 B1 | * | 11/2011 | Yawitz et al. | 715/776 |
| 8,392,444 B2 | * | 3/2013 | Shwartz et al. | 707/765 |
| 8,655,869 B2 | * | 2/2014 | Ferrari et al. | 707/722 |
| 2005/0283473 A1 | * | 12/2005 | Rousso et al. | 707/5 |
| 2008/0183735 A1 | * | 7/2008 | Bruckner et al. | 707/101 |
| 2010/0306229 A1 | * | 12/2010 | Timm et al. | 707/767 |
| 2011/0218986 A1 | * | 9/2011 | O'Hanlon | 707/709 |
| 2012/0130706 A1 | * | 5/2012 | Qiu et al. | 704/9 |
| 2013/0124514 A1 | * | 5/2013 | Datta et al. | 707/728 |

* cited by examiner

*Primary Examiner* — Jeff A. Burke
*Assistant Examiner* — Thong Vu
(74) *Attorney, Agent, or Firm* — Schwegman Lundberg & Woessner, P.A.

(57) ABSTRACT

An input query can be spell checked by first parsing the input query into one or more tokens. The one or more tokens are then compared against spell storage tables to derive alternative tokens. A spell cursor is launched, with the spell cursor calculating scores for permutations of the tokens and alternative tokens, and the scores representing a likelihood that a user intended to use the permutation as the input query. A memory table may then be formed including the permutations and scores. The memory table can then be passed to a column cursor, the column cursor designed to form an output table of results based on queries to a database using the permutations.

18 Claims, 9 Drawing Sheets

| Position 1 | Position 2 | Position 3 | Score |
|---|---|---|---|
| Zune | 16GB | White | 54.34 |
| Samsung | 64GB | White | 32.11 |
| Wung | Gob | White | 12.95 |
| Zune | 32GB | White | 11.29 |
| Zune | 64GB | White | 10.45 |
| Zune | 16GB | Black | 7.53 |
| Zune | 8GB | Black | 5.55 |

SPELL CHECK USING COLUMN CURSOR

RELATED APPLICATIONS

This application claims priority to U.S. Provisional Application No. 61/675,793, filed on Jul. 25, 2012, and entitled, "SYSTEMS AND METHODS TO BUILD AND UTILIZE A SEARCH INFRASTRUCTURE," which is hereby incorporated by reference in its entirety as if set forth herein.

TECHNICAL FIELD

The present application relates generally to the technical field of search query processing, and, in various embodiments, to spell checking the search queries.

BACKGROUND

When trying to find an item on an e-commerce site, users often type a query into the site's search engine, which attempts to match that query against inventory, either active or inactive, on the site. Active inventory is currently available, whereas inactive inventory is not available, as it has expired or has already been sold. Although matches for the query are often found and shown to the user, there are also many situations where the site is unable to match the query to items. This can commonly be caused by spelling errors, either through typographical errors, lack of knowledge of proper spelling of terms, and/or lack of knowledge about proper formatting for particular terms, such as model names or numbers of items. As a result, a user in such a situation sees zero inventory from the e-commerce site, despite the fact that items similar or otherwise relevant to those desired by the user might be available.

BRIEF DESCRIPTION OF THE DRAWINGS

Some embodiments re illustrated by way of example and not limitation in the figures of the accompanying drawings, in which like reference numbers indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Inventory on an e-commerce site, such as an auction site, is often stored as a series of documents, with each document pertaining to an item for sale. In an example embodiment, the documents may be stored in a directed acyclic word graph (DAWG), as defined later in this document. Search queries entered on the e-commerce site by users are searched against the DAWG to attempt to find matching documents. In an example embodiment, this search is performed using a cursor. The mechanism of the cursor and the DAWG will be described in more detail below. The cursor mechanism comprises two parts: a row cursor and a column cursor. A row cursor takes the search query and attempts to locate one or more document identifiers corresponding to documents matching the query. The output of the row cursor is therefore a set of document identifiers, which are then passed to the column cursor. The column cursor then searches on these document identifiers to determine portions of the documents that match the search queries and returns search results. If a spelling or other error, however, results in no document identifiers being returned by the row cursor, then the column cursor is unable to return search results.

As such, in accordance with an example embodiment, when a row cursor is unable to return document identifiers (or in lieu of the row cursor being run), a specialized memory table is created at runtime identifying token combinations of possible candidate search queries as well as a score for each combination. This memory table may then be used by the column cursor to identify search results to return.

Figure 1:
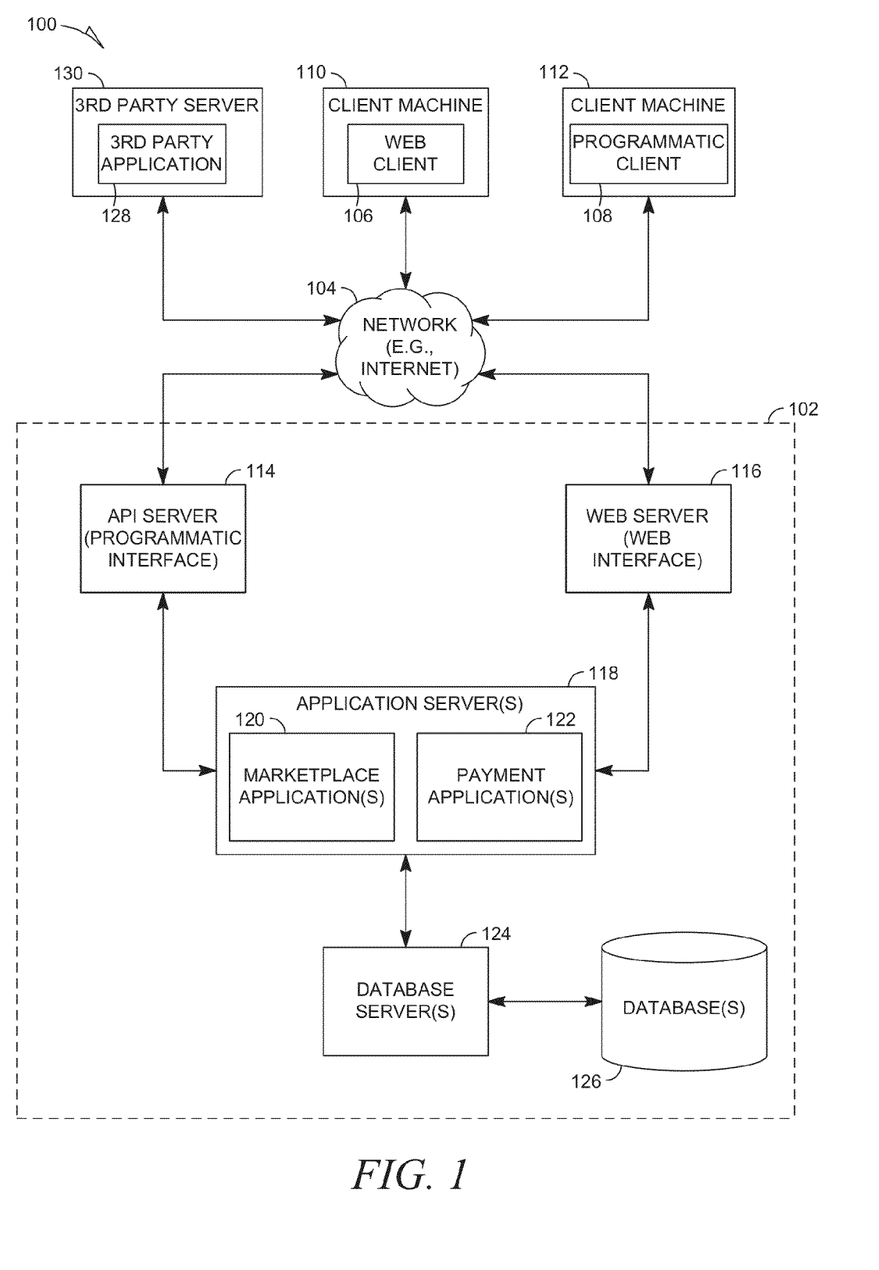
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An Application Programming Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
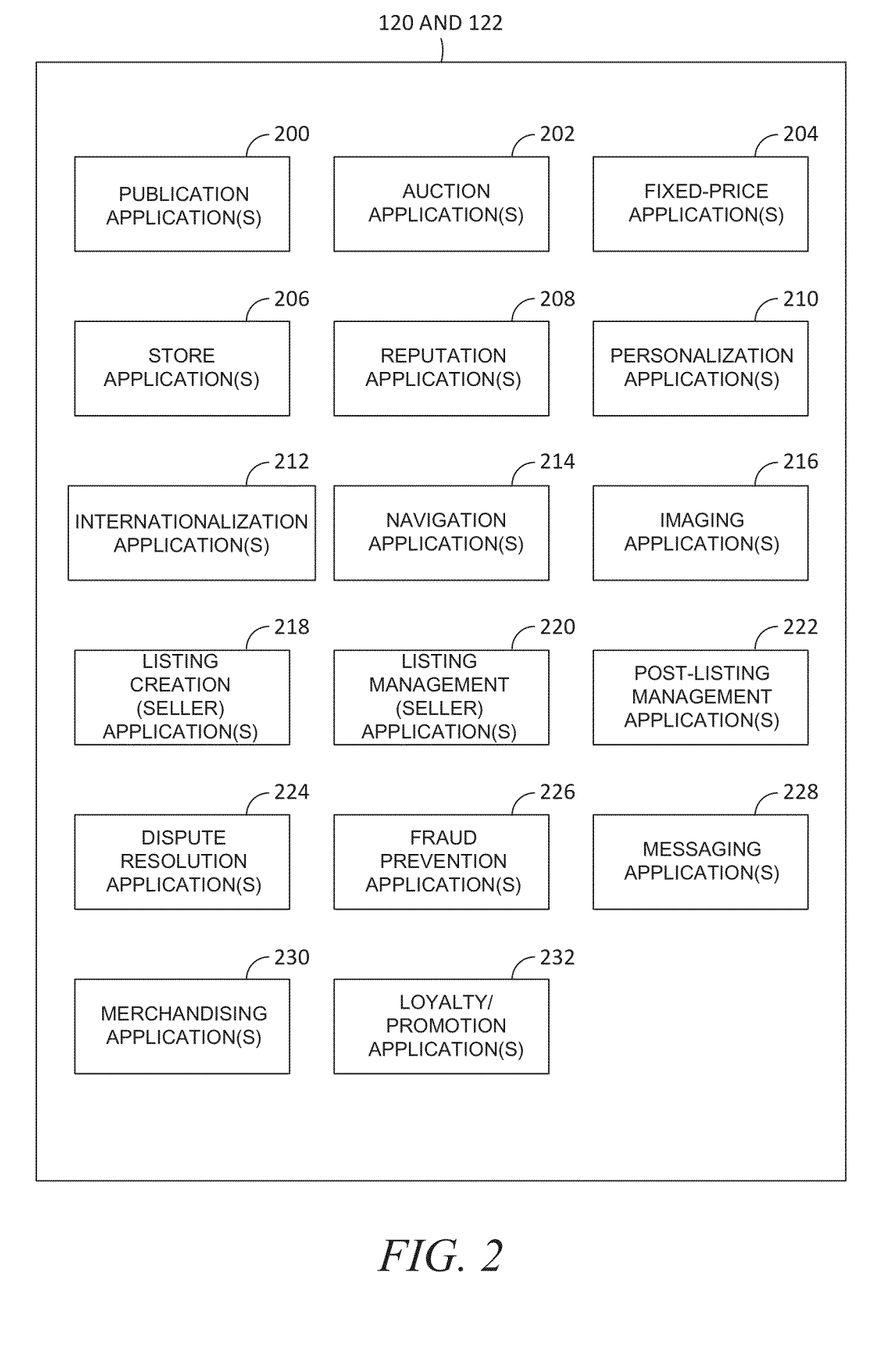
FIG. 2 is a block diagram illustrating multiple applications that, in one example embodiment, are provided as part of the networked system.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings, available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (vow)) messages via the wired (e.g., the Internet), Plain Old Telephone Service (POTS), or wireless (e.g., mobile, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyally or promotion points for each transaction established and/or concluded with a particular seller, and be offered a reward for which accumulated loyalty points can be redeemed.

Figure 3:
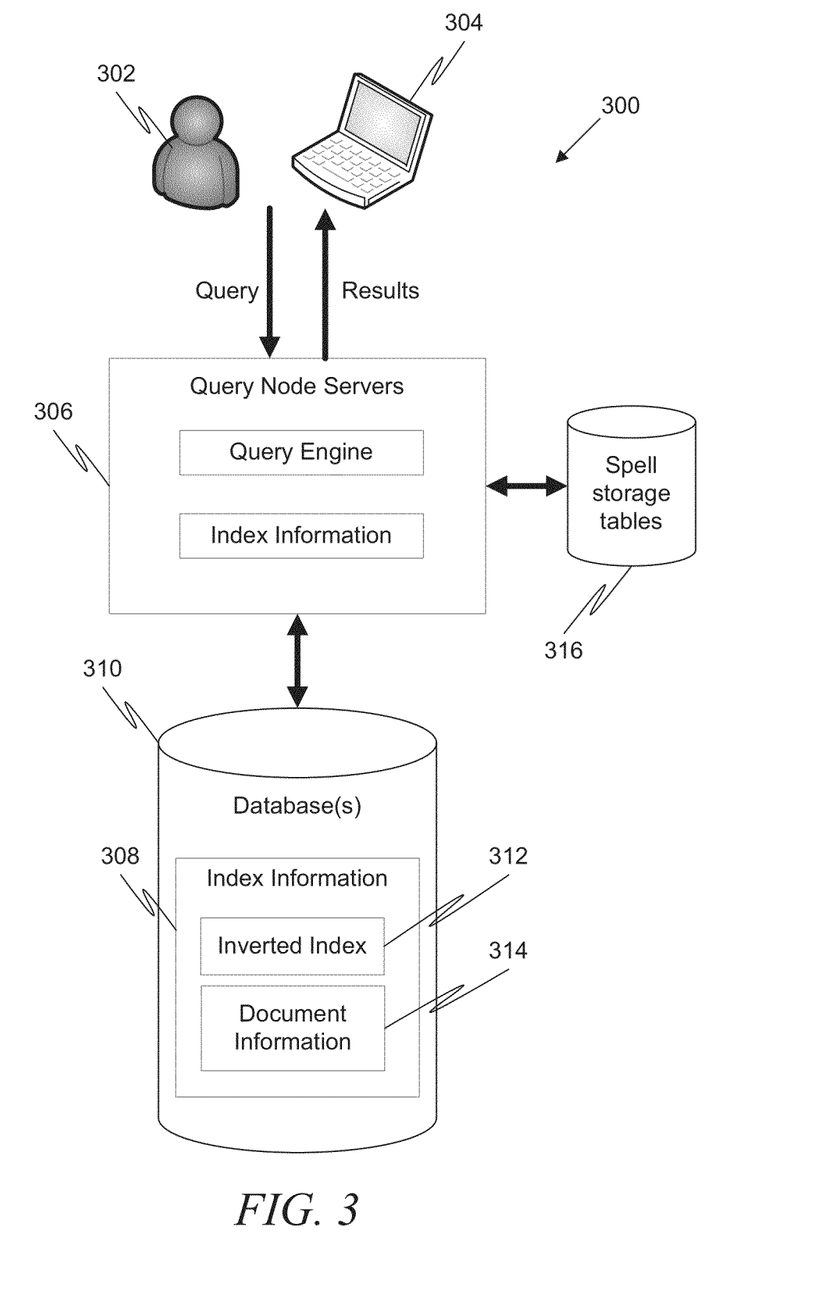
FIG. 3 is a diagram illustrating a search architecture, in accordance with an example embodiment.

As stated earlier, in an example embodiment, the documents on the e-commerce site may be stored as a DAWG. A DAWG is a data structure that represents a set of strings and allows for a query operation that tests whether a given string belongs to the set in time proportional to its length. The entry point into the graph represents a starting letter in the search, and one can travel from a node to two other nodes, depending on whether the letter matches the one being searched for. FIG. 3 is a diagram illustrating a search architecture, in accordance with an example embodiment. In the architecture 300, a user 302 operates a client computer 304 to enter a query that is received by one or more query node servers 306 that, in turn, may apply the query to the index information 308 stored in database(s) 310 to identify and return search results that reference an appropriate document. The index information 308 may include an inverted index 312 and document information 314. An inverted index (e.g., inverted index 312), as is well known in the art, is an index data structure storing a mapping from content (e.g., content contained by the document), such as words or numbers, to its locations in a database file, or in a document or a set of documents. The document information 314 may store the documents (e.g., document data, column group data) and/or information contained by the documents.

Merely for example, a "document X" may include the words "apple," "orange," and "banana;" a "document Y" may include the words "apple" and "orange; and, a "document Z" may include the word "apple." An inverted index for the words in documents X, Y, and Z may be generated as follows:

| Word | Document |
| --- | --- |
| apple | X(1), Y(1), Z(1) |
| orange | X(2), Y(2) |
| banana | X(3) |

The above inverted index may be utilized to identify the word "apple" as being positioned in the first word of documents X, Y, and Z; the word orange as being positioned in the second word of the documents X and Y; and the word "banana" as being positioned as the third word of the document X. Accordingly, the above inverted index may be utilized to map a keyword "apple" contained in a query that is received from a client computer to the documents X, Y, and Z that are further referenced in search results that are returned to the client computer. It is appreciated by one skilled in the art that the inverted index 312 corresponds to the underlying database that it describes. Accordingly, any update to the underlying database is reflected in a corresponding update to the inverted index 312. Updates to the database may include the addition and deletion of documents in the document information 314 as well as the update of any of the contents contained by the documents in the document information 314. In the present embodiment, the index information 308 may be updated in real time to respond to a query in real time with accurate search results that include the most recent document information 314.

Also depicted are spell storage tables 316. As will be described later, these spell storage tables 316 can be used to aid in processing of a spell cursor.

Figure 4:
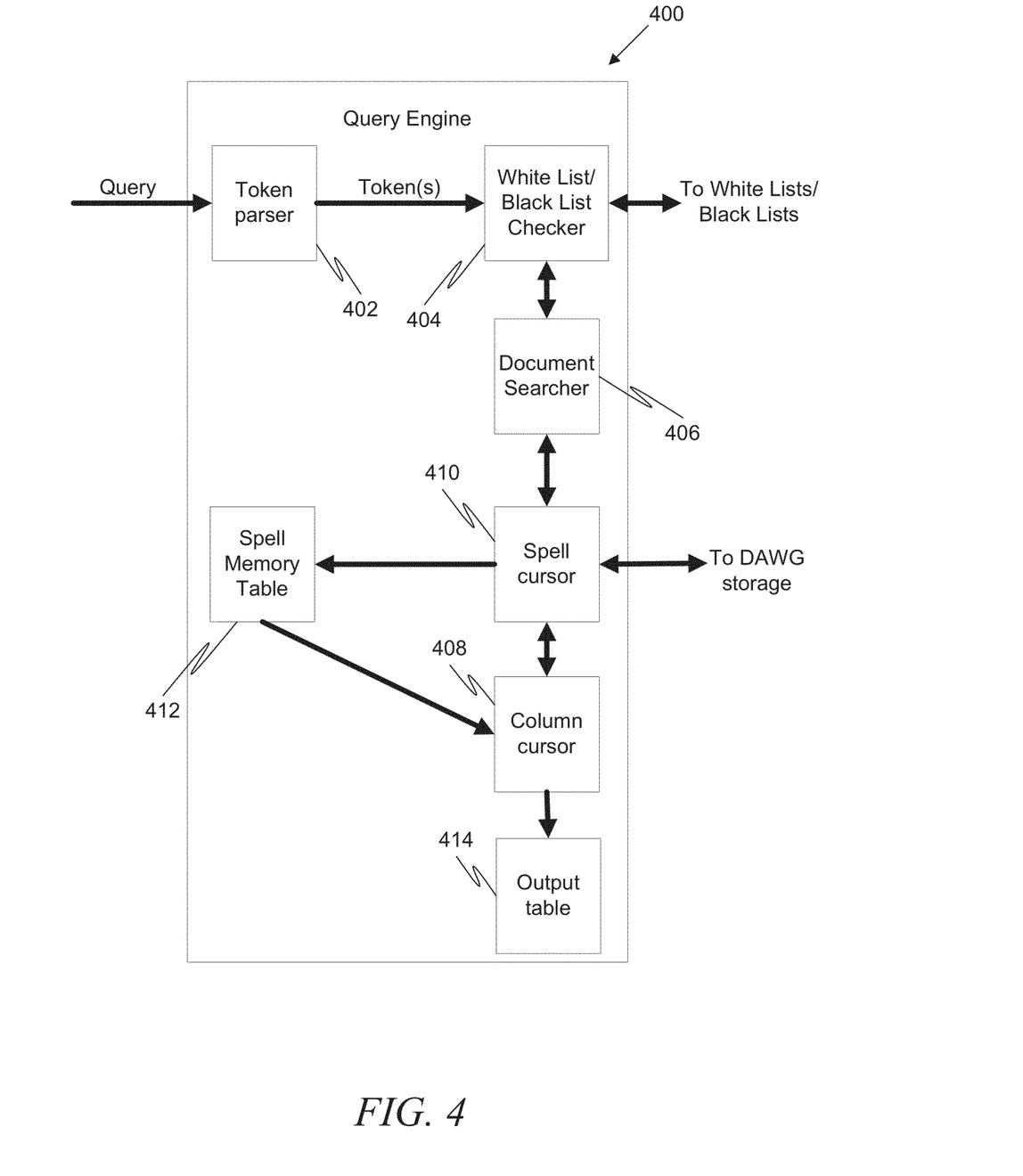
FIG. 4 is a diagram illustrating an architecture of a query engine, in accordance with an example embodiment.

FIG. 4 is a diagram illustrating an architecture of a query engine 400, in accordance with an example embodiment. The query engine 400 may or may not correspond to the query engine 300 of FIG. 3. The query engine 400 may include a token parser 402, which acts to parse a query into one or more tokens. A white/black list checker 404 can then check each of these tokens against a white and/or black list. This will be described in more detail below. A document searcher 406 can then perform a search on the DAWG storage for matching documents. This may include, for example, a column cursor 408, which is a function that searches for appropriate columns in the DAWG storage. If no matching document is found (or if a spelling error is suspected for other reasons), a spell cursor 410 may be launched by comparing the tokens from the token parser 402 against the spell storage table 412. The spell storage tables may contain possible alternative tokens as well as other information necessary to provide scores estimating the likelihood that particular tokens were really what the user meant to type (such as information about prior search queries helpful when applying a language model, as will be described later).

The spell memory table 412, as described later, may include various different alternative searches (comprising various combinations of tokens and alternative tokens). This spell memory table 412 can then be used by the column cursor 408 to provide an output table 414 including documents corresponding to some suggested alternative searches. Notably, the column cursor 408 utilizing the spell memory table 412 may be the same column cursor 408 used earlier (or in other searches) to directly retrieve matching documents. As such, the spell check architecture essentially piggy-backs on to the existing column cursor architecture.

Figure 5:
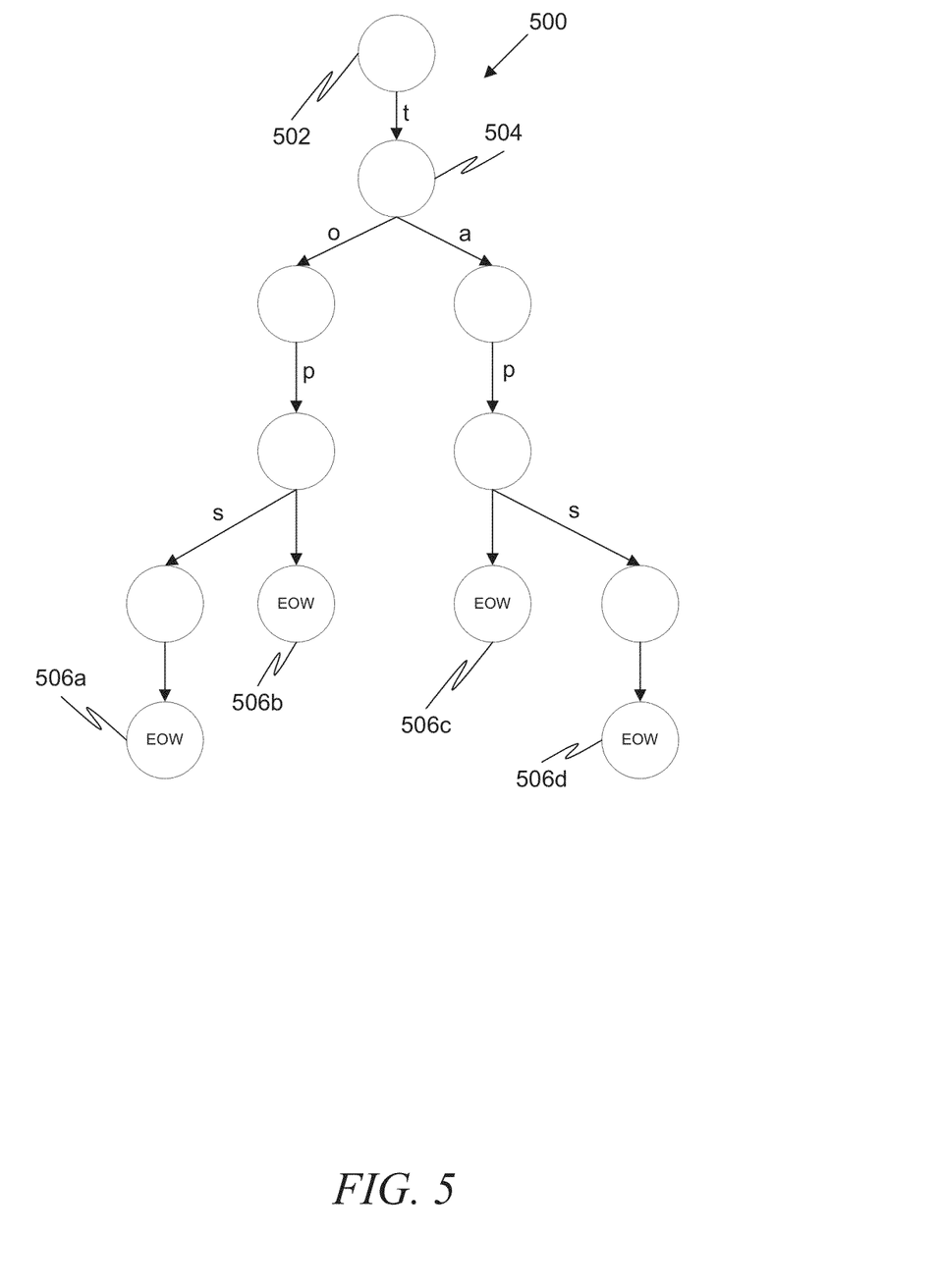
FIG. 5 is a diagram illustrating a directed acylcic word graph, in accordance with an example embodiment.

FIG. 5 is a diagram illustrating a DAWG 500, in accordance with an example embodiment. The DAWG 500 is directed in that one can only move in a specific direction between two nodes. It is also acyclic because there are no cycles, thus avoiding infinite loops. The transition between nodes, such as between node 502 and node 504, represents a letter. Leaf nodes 506a-506d represent the ends of words.

In an example embodiment, as described earlier, a virtual memory table may be built on top of DAWG storage to provide for spell check services. Multiple probes are inserted into DAWG storage by iterating through different pieces of the graph to create a run-time table that can be queried against in a relational environment. The result of each probe is represented as a separate row in the virtual table. This is another technique for transposing a directed graph into a table that can then be queried by a query engine designed to only operate on tables.

At a high level, a spell check result is encapsulated into a single query. This query, or expression, is evaluated against a spell storage, creating a spell cursor. The spell cursor looks up potential candidates in the DAWG storage and generates a memory table, including suggested search queries and their scores. The spell storage may be based on the DAWG storage and index tokens based on its 3-grams, 2-grams, and 1-grams (which are forms of n-grams) and their frequencies. An n-gram is a contiguous sequence of n tokens from a given text or speech. One can think of each token as a word, although there are tokens that are more than one word and tokens that are portions of words. In that manner, a 3-gram would be a combination of three words, such as if the user searched "tablet computer 16 GB" (although in some instances the term "tablet computer" may be considered a single token, and the search would be considered a 2-gram).

The run-time memory table is then used as input to a column cursor to locate individual search results.

In this manner, the same cursor infrastructure used to perform searches can be used to perform spell checks. This may be known as a unified storage system. This helps to reduce maintenance costs and make searching and spell checking more efficient.

In an example embodiment, two general models are utilized for the spell cursor 412: an error model and a language model. The goal of the combination of these two models is to determine, for an input token tok{i} in the context of tok{0} . . . tok{i-1} and tok{i+1} . . . tok{n} which are the best candidates for spelling correction of tok{i}. Given tok{i}, without knowledge of the context there are a set of tokens that can be retrieved from the DAWG storage (for example, tok{i}', tok{i}", tok{i}''') that have some measure of similarity to tok{i}. The error model gives the possibility that given tok{i}, the user actually meant one of these alternative tokens. This can be measured by determining how much the characters from tok{i} need to be changed in order to arrive at each of the alternative tokens (for example, tok{i}'). There are different models which can be used to measure this. For example, in a keyboard model, the system may find the characters that are different between tok{i} and tok{i}' and then determine how far apart they are on a keyboard. The theory is that, if the user committed a typographical error, then the distance should not be great. For example, if the only character that is different is "i" tok{i}' that is different than a "u" in tok{i}', then the distance between these two characters on most keyboards is only 1 key. On the other hand, if the "i" tok{i} is "d" tok{i}", then the distance between the keys is much greater on most keyboards. Thus, in this model, the edit distance of "tok{i}' will be considered to be less than the edit distance of tok{i}", in comparison to tok{i}, despite the fact that "d" is closer in the alphabet to "i" than "u" is.

In another example, a phonetic model can be used. This measures how closely the tokens sound alike, regardless of spelling. In such a model, for example, "high" may be considered to have less of an edit distance from "hi" than the edit distance between "hu" and "hi," despite the fact that "hu" has only one character difference and only one key difference in the keyboard model.

There may be other models taken into account as well. For example, there may be a model that determines how easily typed the terms are, given a general keyboard layout, that may differ from mere key difference. Additionally, the various models can be combined as well in some embodiments, and these combinations may also include various weightings The end result of the error model, however, is a score reflecting the likelihood, for each tok{i} and each tok{i} alternative, that tok{i} is a mistaken form of the tok{i} alternative.

The second general model used by the spell cursor 412 is the language model. The language model examines the token in the context of the other tokens of the search query, and tells probabilities based on what past searches have done. In this model, a sample pool of past behavior is maintained. An algorithm is then performed examining n-gram tokens to determine the probabilities that a token was meant to be another token based on the n-gram surrounding tokens. In an example embodiment, a 3-gram algorithm is used, wherein not just the examined token but also the tokens before and after the examined tokens are used to find potential alternative tokens. With 3-gram, the probability model for the token would be $\{(tok\{i\})=w1*P(tok\{i\}))+w2*P(tok\{i\}/tok\{i-1\})+w3*P(tok\{i\}/tok\{i-2\}tok\{i-1\}$, where $P(tok\{i\}/tok\{i-1\})$ means the probability of token tok{i} when tok{i-1} presents, and w1, w2, and w3 are weights assigner heuristically.

The spell cursor 412 may then combine these two general models. In an example embodiment, this is performed by multiplying the score from the error model for the score from the language model for each token combination alternative.

The spell cursor 412 is unique in that it creates a memory table without returning the identifiers of the documents in the storage. This memory table is created on the fly and can be examined by the column cursor specific for the spell check.

It should be noted that it may not be necessary to run the spell check at all in certain circumstances. A white list and/or black list of tokens may be created and maintained. If a token in question is on one of these lists, there may be no need for a spell check to be performed. For example, if the token is on a white list, then someone has designated the token as accurate, even if it returns no results. For example, the term "Zune" may be placed on a white list and considered accurate even if there are no Zune's currently in the inventory of the e-commerce site. Likewise, the black list may contain tokens that someone has designated as blocked, such as curse words.

Figure 6:
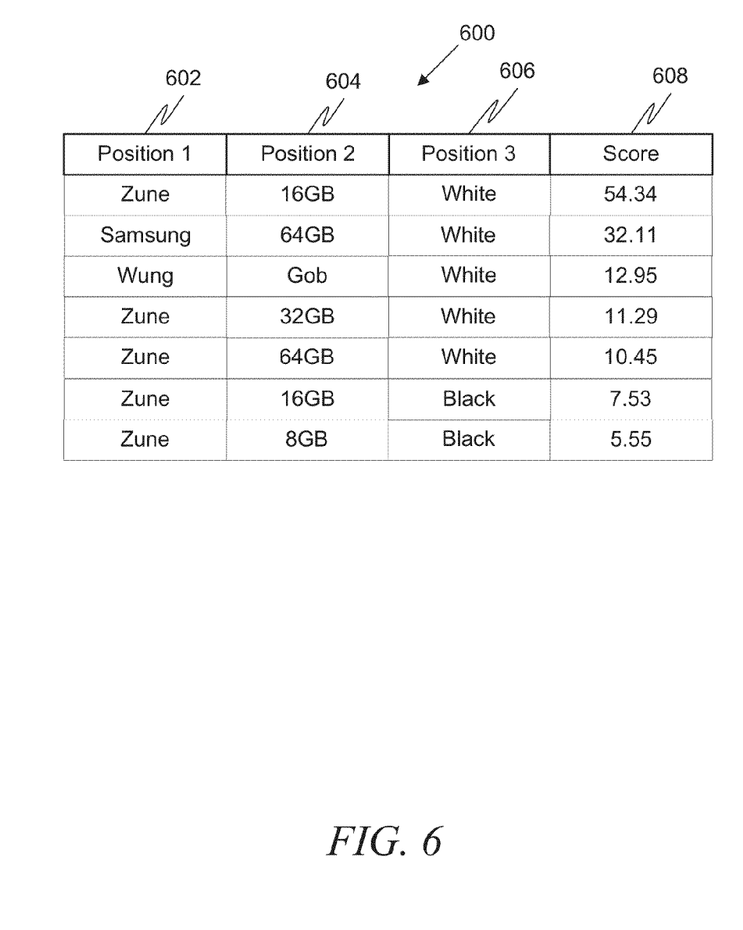
FIG. 6 is a diagram illustrating an example of a memory table, in accordance with an example embodiment.

FIG. 6 is a diagram illustrating an example of a memory table, in accordance with an example embodiment. In this example, assume the user has entered the search query "Zune 16 GB White." The memory table 600 comprises combinations of tokens along with corresponding scores. A first column 602 contains the token in a first position of a suggested query. A second column 604 contains the token in a second position of a suggested query. A third column 606 contains the token in a third position of a suggested query. A fourth column 608 contains the score associated with each suggested query. It should be noted that not all possible permutations need to be listed in the memory table. In an example embodiment, a threshold score is used to determine which permutations are listed, with only permutations having scores exceeding the threshold score being placed in the memory table. In another example embodiment, a set number of permutations are listed in the memory table, with the permutations chosen being the highest ranking permutations based on score.

Figure 7:
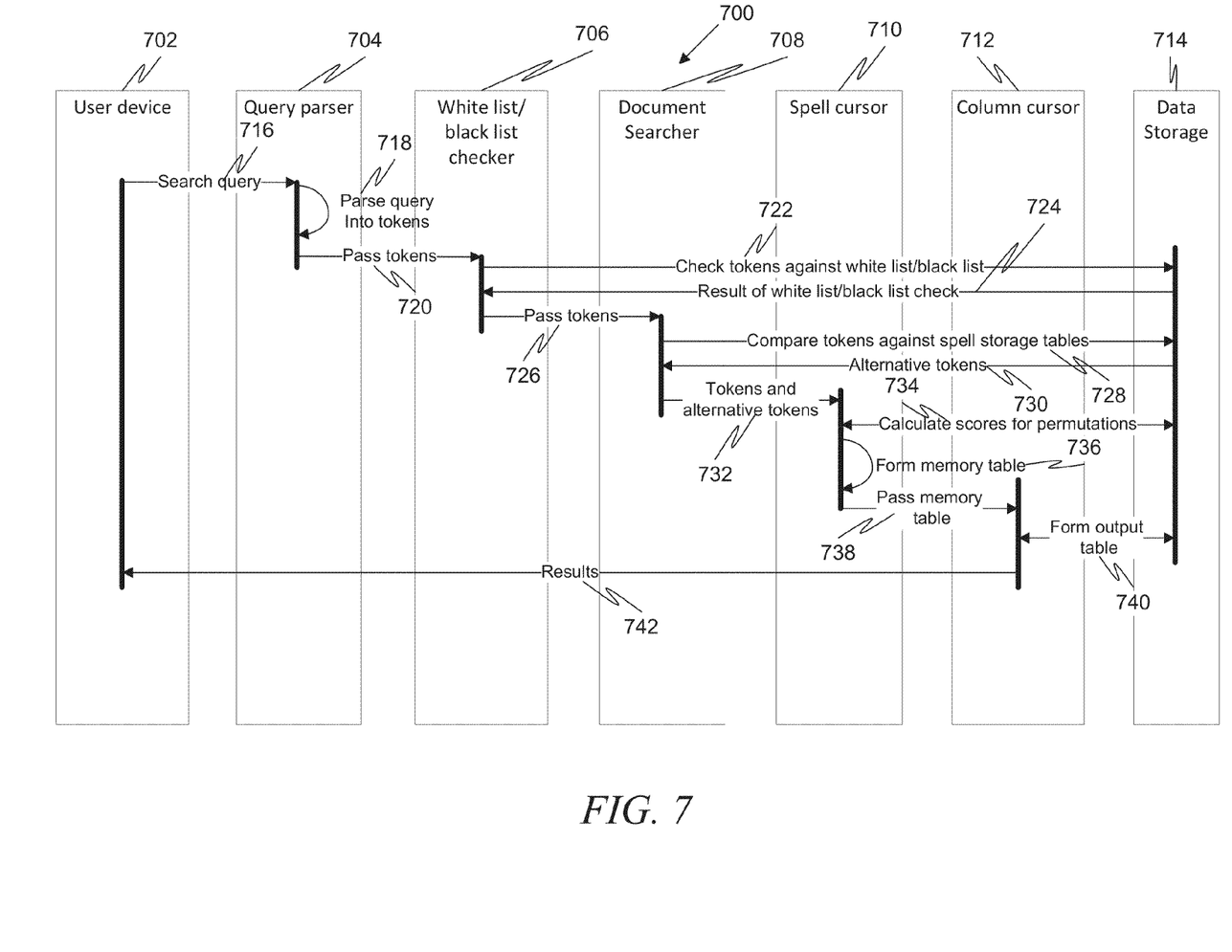
FIG. 7 is an interaction diagram illustrating a method, in accordance with an example embodiment, of performing a spell check of a search query.

FIG. 7 is an interaction diagram illustrating a method 700, in accordance with an example embodiment, of performing a spell check of a search query. The method 700 may involve a number of components, including user device 702, query parser 704, white list/black list checker 706, document searcher 708, spell cursor 710, column cursor 712, and data storage 714. It should be noted that data storage 714 is presented as a single component for convenience purposes. In many example embodiments, however, the various sub-components within data storage 714 may be contained in different databases and/or physical devices.

At 716, the user device 702 issues a search query. At 718, the query parser 704 parses the query into tokens. At 720, the tokens are then passed to a white list/black list checker 706. At 722, the white list/black list checker 706 checks the tokens against a white list and/or black list stored in data storage 714. At 724, the result of this white list/black list check is returned. If this check determines that the tokens are not on a white list and/or black list, then at 716 the tokens may be passed to a document searcher 708. The document searcher 708 can then compare the tokens against spell storage tables at 728, resulting in alternative tokens being identified at 730. The tokens and alternative tokens can be passed to a newly spawned spell cursor 710 at 732.

At 734, scores for the various permutations of the tokens and alternative tokens can be calculated. This may be based on information stored in the DAWG storage. At 736, a memory table may be stored using the permutations and the scores.

At 738, the memory table may be passed to a column cursor 712, which can form an output table at 740, again using information stored in the DAWG storage. The results from this represent results of suggested queries and can be passed back to the user device 702 at 742.

Figure 8:
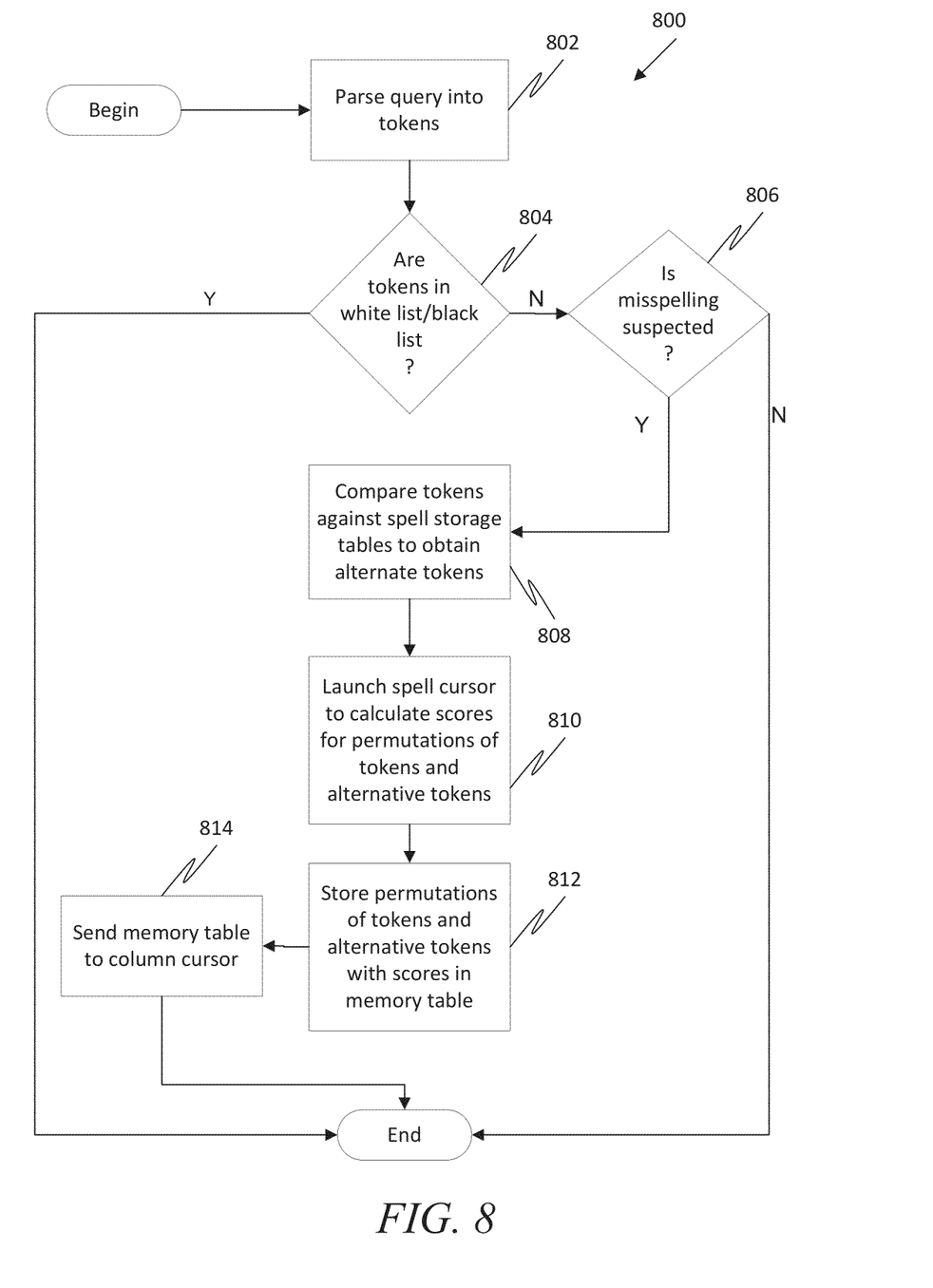
FIG. 8 is a flow diagram illustrating a method, in accordance with an example embodiment, of performing a spell check of a search query.

FIG. 8 is a flow diagram illustrating a method 800, in accordance with an example embodiment, of performing a spell check of a search query. Beginning the method 800 at 802, a query is parsed into tokens. At 804, it is determined if the tokens are in a white list and/or black list. If so, then the process may end. If not, then at 806 it is determined if a misspelling is suspected. This may be performed in a number of ways. In an example embodiment, this involves performing a search on documents in the DAWG, and suspecting a misspelling if no matches are found.

If a misspelling is not suspected, the process may end. If one is suspected, then at 808 the tokens are compared against spell storage tables to obtain alternate tokens. At 810, a spell cursor is launched to calculate scores for permutations of tokens and alternative tokens. The term "tokens and alternative tokens" is intended to be broadly construed to cover all tokens, including tokens part of the original query and alternative tokens derived later. It is also intended to cover instances where one or more permutations includes only alternative tokens, and no tokens that exactly match tokens in the original query.

At 812, permutations of tokens and alternative tokens are stored with scores in a memory table. At 814, the memory table is sent to a column cursor, where it is used to derive results from the DAWG storage.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
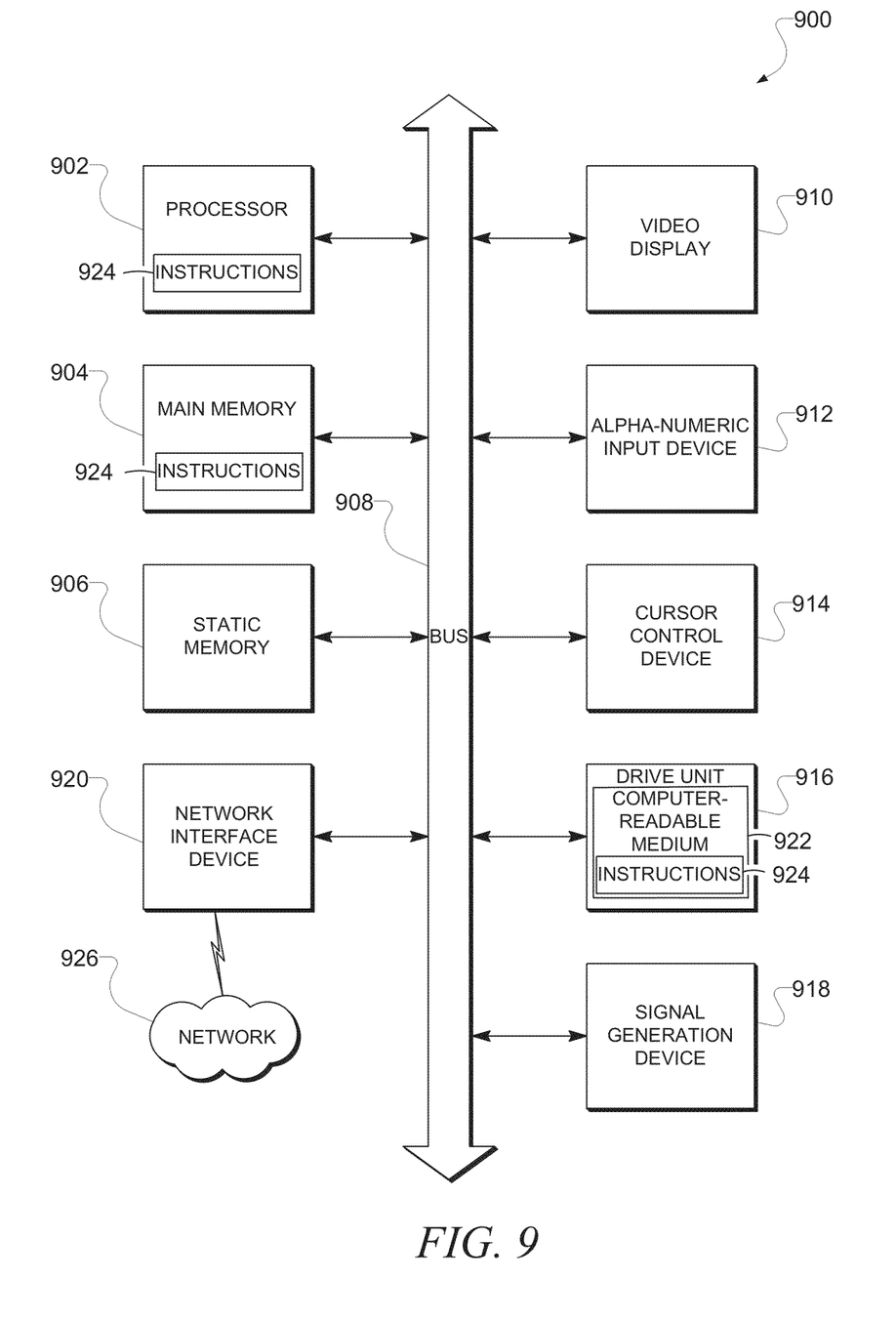
FIG. 9 is a block diagram of a machine in the example form of a computer system within which instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (CPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 924 may further be transmitted or received over a communications network 826 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shalt be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
    a query parser configured to parse an input query into one or more tokens;
    a document searcher configured to compare the one or more tokens against spell storage tables to derive alternative tokens, and to launch a spell cursor in response to a determination that no matches are found in the spell storage tables for the one or more tokens;
    the spell cursor configured to calculate scores for permutations of the tokens and alternative tokens, the scores representing a likelihood to use the permutation as the input query, the spell cursor calculates the scores by accessing a directed acyclic word graph (DAWG) containing alternative tokens indexed by n-grams of continuous sequences of alternative tokens; and
    the spell cursor further configured to generate a memory table including the permutations of the tokens and alternative tokens and the calculated scores, and to pass the memory table to a column cursor, the column cursor designed to generate an output table of results based on queries to a database using the permutations.

2. The system of claim 1, wherein the column cursor forms the output table by accessing a DAWG.

3. The system of claim 1, further comprising a white list/black list checker configured to check the tokens against a white list or black list.

4. The system of claim 1, wherein the document searcher is further configured to run a query against the DAWG by utilizing a row cursor to identify documents and utilizing the column cursor to form an output table of results based on the query.

5. The system of claim 1, wherein the database contains a plurality of documents, each of the documents corresponding to an item for sale on an e-commerce web site.

6. The system of claim 1, wherein the database comprises a second DAWG, the second DAWG containing an inverted index mapping tokens to locations where the tokens are found in documents.

7. A method of spell checking a query, the method comprising:

parsing an input query into one or more tokens;

comparing the one or more tokens against spell storage tables to derive alternative tokens;

launching a spell cursor in response to a determination that no matches are found in the spell storage tables for the one or more tokens, the spell cursor calculating scores for permutations of the tokens and alternative tokens, the scores representing a likelihood to use the permutation as the input query, the spell cursor calculates the scores by accessing a directed acyclic word graph (DAWG) containing alternative tokens indexed by n-grams of continuous sequences of alternative tokens;

generating a memory table including the permutations of the tokens and alternative tokens and the calculated scores; and generating the memory table to a column cursor, the column cursor designed to form an output table of results based on queries to a database using the permutations.

8. The method of claim 7, wherein the column cursor forms the output table by accessing a DAWG.

9. The method of claim 7, wherein the calculating scores includes calculating the likelihood using an error model, the error model computing an edit distance between a token and an alternative token.

10. The method of claim 9, wherein the edit distance is based on a distance between keys on a typical keyboard for characters different between the token and the alternative token.

11. The method of claim 9, wherein the edit distance is based on a distance between phonetic pronunciations for phonetics different between the token and the alternative token.

12. The method of claim 7, wherein the calculating scores includes calculating the likelihood using a language model, the language model taking into account contextual tokens surrounding each token of the input query.

13. The method of claim 7, further comprising comparing the one or more tokens against a white list or black list.

14. The method of claim 7, further comprising running a query against the DAWG by utilizing a row cursor to identify documents and utilizing the column cursor to form an output table of results based on the query.

15. The method of claim 7, wherein the database contains a plurality of documents, each of the documents corresponding to an item for sale on an e-commerce web site.

16. A non-transitory computer-readable storage medium comprising instructions that, when executed by at least one processor of a machine, cause the machine to perform operations comprising:

parsing an input query into one or more tokens;

comparing the one or more tokens against spell storage tables to derive alternative tokens;

launching a spell cursor in response to a determination that no matches are found in the spell storage tables for the one or more tokens, the spell cursor calculating scores for permutations of the tokens and alternative tokens, the scores representing a likelihood to use the permutation as the input query, the spell cursor calculates the scores by accessing a directed acyclic word graph (DAWG) containing alternative tokens indexed by n-grams of continuous sequences of alternative tokens;

generating a memory table including the permutations of the tokens and alternative tokens and the calculated scores; and generating the memory table to a column cursor, the column cursor designed to form an output table of results based on queries to a database using the permutations.

17. The non-transitory computer-readable storage medium of claim 16, wherein the column cursor forms the output table by accessing a DAWG.

18. The non-transitory computer readable storage medium of claim 16, wherein the calculating scores includes calculating the likelihood using an error model, the error model computing an edit distance between a token and an alternative token.

* * * * *